United States Patent
Horiguchi

(10) Patent No.: US 6,468,681 B1
(45) Date of Patent: Oct. 22, 2002

(54) FUEL CELL SYSTEM

(75) Inventor: Munehisa Horiguchi, Hokkaido (JP)

(73) Assignee: Kabushikikaisha Equos Research (JP)

( * ) Notice: Subject to any disclaimer, the term of this patent is extended or adjusted under 35 U.S.C. 154(b) by 0 days.

(21) Appl. No.: 09/336,704

(22) Filed: Jun. 21, 1999

(30) Foreign Application Priority Data

Jun. 26, 1998 (JP) ............................................. 10-179974

(51) Int. Cl.[7] .......................... H01M 8/09; H01M 8/12; H01M 2/00; H01M 2/02; H01M 2/14
(52) U.S. Cl. ............................. 429/26; 429/34; 429/38
(58) Field of Search ............................ 429/26, 20, 34, 429/38

(56) References Cited

U.S. PATENT DOCUMENTS

| | | | | |
|---|---|---|---|---|
| 4,795,683 A | * | 1/1989 | McElroy | 429/13 |
| 5,503,944 A | * | 4/1996 | Meyer et al. | 429/13 |
| 5,678,410 A | * | 10/1997 | Fujita et al. | 62/7 |
| 5,976,725 A | * | 11/1999 | Gamo et al. | 429/25 |
| 6,106,964 A | * | 8/2000 | Voss et al. | 429/20 |

FOREIGN PATENT DOCUMENTS

| | | | | |
|---|---|---|---|---|
| JP | 7-176313 | | 7/1995 | |
| JP | 7-192743 | | 7/1995 | |
| JP | 10-92456 | * | 4/1998 | ............ H01M/8/10 |
| JP | 11-144748 | * | 4/1998 | ............ H01M/8/10 |
| JP | 10-172593 | | 6/1998 | |
| JP | 10-247505 | | 9/1998 | |
| JP | 10-255828 | | 9/1998 | |

* cited by examiner

Primary Examiner—Stephen Kalafut
Assistant Examiner—Julian A. Mercado
(74) Attorney, Agent, or Firm—Lorusso & Loud

(57) ABSTRACT

A fuel cell system has a plurality of fuel cells each having a cathode and an anode disposed on opposite sides of an electrolyte membrane, having an air supply passage through which atmospheric air is supplied to the cathode. A fuel gas supply passage supplies hydrogen gas from a hydrogen storing alloy to the anode; and water spray nozzles spray liquid water directly onto the cathode. The hydrogen storing alloy is heated by heat exchange with the exhaust air at an elevated temperature discharged from the cathode, to facilitate its endothermic reaction in which it produces hydrogen gas to be supplied to the anode. The sprayed water is fed to the hydrogen storing alloy so as to cool the same to thereby enhance its exothermic reaction in which hydrogen gas is stored in the hydrogen storing alloy.

6 Claims, 11 Drawing Sheets

FUEL CELL SYSTEM

BACKGROUND OF THE INVENTION

1. Field of the Invention

The present invention relates to a fuel cell system with hydrogen storing alloy from which hydrogen gas is introduced to an anode of a fuel cell unit.

2. Description of the Prior Art

A fuel cell system comprises in general a fuel cell unit, an air supplying means and a fuel supplying means. The fuel cell unit has an electrolyte membrane such as a proton exchange membrane (PEM) between two electrodes, that is a cathode to which an atmospheric air (or oxygen) is supplied through the air supplying means and an anode to which hydrogen gas is supplied through the fuel supplying means. Oxygen at the cathode and hydrogen at the anode react with each other to generate electricity. In actual application, the system includes a plurality of fuel cells which are stacked in series with a separator being interposed between adjacent fuel cells.

An attempt has been proposed that a hydrogen storing alloy is used as a hydrogen gas supply source. As known, the hydrogen storing alloy is capable of storing therein and discharging therefrom hydrogen gas depending upon the ambient temperature and the partial pressure of hydrogen therearound. The hydrogen storing alloy stores hydrogen gas in an exothermic reaction whereas it discharges hydrogen gas in an endothermic reaction. For example, in a fuel cell system disclosed in Japanese un-examined patent publication No. 7-192743, water circulates between the fuel cell and the hydrogen storing alloy. More particularly, water is heated after it is used to cool down the fuel cell and then fed to around the hydrogen storing alloy which is activated by the heated water to discharge hydrogen gas which is supplied to the anode of the fuel cell. Water of a lowered temperature as a result of the endothermic reaction of the hydrogen storing alloy is returned to the fuel cell for use as a coolant.

Although this prior art system provides improved heat circulation throughout the fuel cell system, water circulation comprises various components including conduits, pumps, valves and radiators. It also requires energy which is a part of electricity generated by the fuel cell unit in the system.

SUMMARY OF THE INVENTION

It is therefore an object of the present invention to provide a fuel cell system capable of eliminating disadvantages of the above-described prior art technology.

Another object of the present invention is to provide a fuel cell system which is simple in construction, small in size, easy to install and, therefore, particularly suitable to be mounted on a vehicle.

According to an aspect of the present invention there is provided a fuel cell system comprising one or more fuel cell units each having an anode, a cathode and an electrolyte membrane interposed between the anode and the cathode; a hydrogen storing alloy from which hydrogen gas is discharged, when heated, to be supplied to the anode of the fuel cell unit; and heating means for heating the hydrogen storing alloy by contact with an exhaust gas from the fuel cell unit.

With this fuel cell system, the hydrogen storing alloy is heated by the exhaust gas which has been heated during operation of the fuel cell unit, thereby producing hydrogen gas. In other words, heat in the exhaust gas enhances the endothermic reaction of the hydrogen storing alloy in which hydrogen gas stored therein is discharged which is supplied to the anode of the fuel cell unit.

The fuel cell unit in the fuel cell system of the present invention may be of any suitable arrangement and construction. By way of example, it comprises a proton exchange membrane (PEM) between the cathode and the anode. PEM acts as an electrolyte and transports therethrough hydrogen ions obtained at the anode of the fuel cell toward the cathode, in the form of proton ($H^+$). The hydrogen storing alloy used in the fuel cell system of the present invention includes $LaNi_5$, $TiFe$, $ZrMn_2$, $Mg_2Ni$ and any other alloy which is capable of discharging hydrogen gas stored therein, when heated. For example, $LaNi_5$ is known to provide endothermic reaction $LaNi_5H_6 \rightarrow LaNi_5 + 3H_2$, when heated to about 50–80° C., causing hydrogen gas to be produced by about 300 liters per hour.

A casing of the hydrogen storing alloy should preferably have a greater a surface area which facilitates heat transmission from the discharge gas. In a preferred embodiment, the casing has a plurality of apertures which allows the discharge gas to enter the interior of the casing. In another preferred embodiment, there are a plurality of tubular casings each containing the hydrogen storing alloy.

The exhaust gas to be used in this invention for heating the hydrogen storing alloy may be either one of the remaining air discharged from the cathode and the remaining hydrogen gas discharged from the anode.

The air discharged from the cathode contains water (vapor) generated by the fuel cell reaction. Accordingly, where the hydrogen storing alloy is heated by the discharged air from the cathode of the fuel cell unit, it is preferable that a condenser is arranged downstream of the hydrogen storing alloy for cooling down the discharged air to collect water. The water collected by the condenser may be reused to moisten the air to be supplied to the cathode. Since, in this invention, the discharged air has been cooled to at least some extent by heat exchange with the hydrogen storing alloy for achieving the endothermic reaction, the condenser may be subjected to a decreased load.

In a preferred embodiment of the fuel cell system of this invention, liquid water is supplied to the cathode. More specifically, liquid water is sprayed directly onto the cathode, which is hereinbelow referred to by "water spray type fuel cell system". In the water spray type fuel cell system, the exhaust gas from the cathode has a greater water content than that from the anode. A part of water in the exhaust gas is collected by heat exchange with the hydrogen storing alloy and the remainder is collected by the condenser.

In accordance with another aspect of the present invention there is provided a fuel cell system comprising one or more of fuel cell units each having an anode, a cathode and an electrolyte membrane interposed between the anode and the cathode; a hydrogen storing alloy which produces hydrogen gas, when heated, to be supplied to the anode of the fuel cell unit; and water spray means for spraying liquid water onto the cathode. The sprayed water is then supplied to the hydrogen storing alloy so as to cool the hydrogen storing alloy to thereby enhance exothermic reaction thereof in which hydrogen gas is stored in the hydrogen storing alloy. The sprayed water functions to suitably moisten the electrolyte membrane such as PEM during operation of the fuel cell unit. In this aspect of the present invention, the sprayed water also functions to cool the hydrogen storing alloy while the fuel cell unit is at a standstill, which facilitates the exothermic reaction by which the hydrogen storing alloy is filled with hydrogen gas. This system makes it unnecessary to provide separate cooling means for cooling the hydrogen storing alloy, or at least minimizes the energy for driving such a separate cooling means.

In accordance with still another aspect of the present invention there is provided a fuel cell system comprising one or more fuel cell units each having an anode, a cathode and an electrolyte membrane interposed between the anode and the cathode; an exhaust port arranged below the fuel cell unit for passing therethrough exhaust gas from the cathode of the fuel cell unit; a suction port arranged below the exhaust port for passing therethrough an air to be supplied to the cathode of the fuel cell unit; and a partition member between the exhaust port and the suction port for effecting heat exchange between the exhaust gas in the exhaust port and the air in the suction port. With this system, the exhaust gas from the cathode having an elevated temperature may be cooled by heat exchange with the air in the suction port having a lower temperature. The exhaust gas from the cathode of the fuel cell unit is relatively weighty because it contains water, which may smoothly fall down with gravity toward the exhaust port. This is particularly suitable when applied to the water spray type fuel cell system in which liquid water is sprayed directly onto the cathode, which will fall down together with the exhaust gas from the cathode. The term "exhaust port" includes an exhaust manifold and any chamber or passage through which the exhaust gas from the cathode is discharged to the open air, whereas the term "suction port" includes any chamber or passage through which the open air is introduced to the cathode of the fuel cell unit.

BRIEF DESCRIPTION OF THE DRAWINGS

The foregoing and other objects and features of the present invention can be apparent from the following description when read in conjunction with the accompanying drawings in which.

DETAILED DESCRIPTION OF PREFERRED EMBODIMENTS

Figure 1:
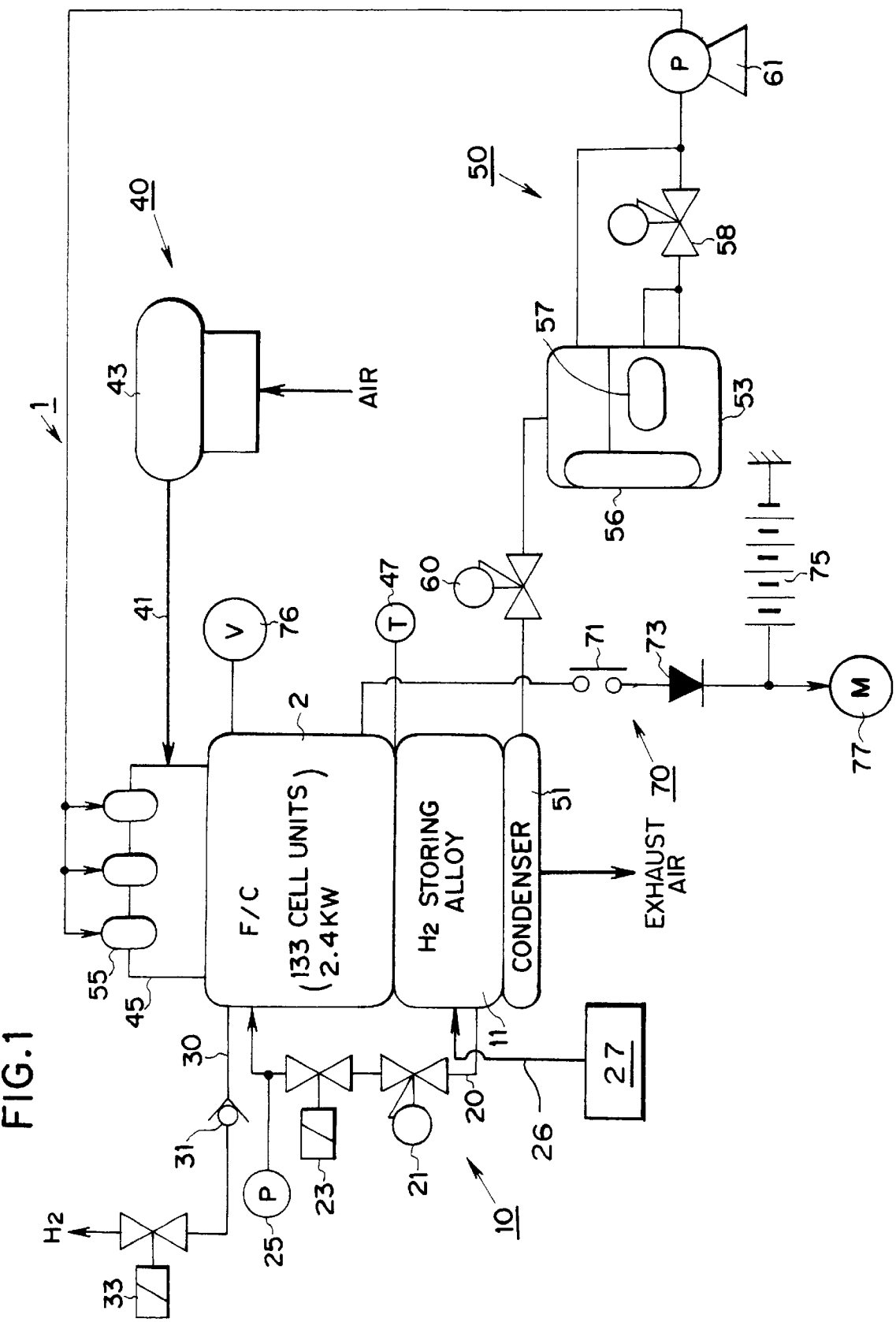
FIG. 1 is a schematic view diagrammatically showing the structure of a fuel cell system embodying the present invention.

FIG. 1 diagrammatically shows the structure of a fuel cell system 1 according to an embodiment of the present invention, which comprises in general a fuel cell unit 2, a fuel gas supply system 10 including a hydrogen storing alloy 11, an air supply system 40, a water supply system 50 and an output system 70.

Figure 2:
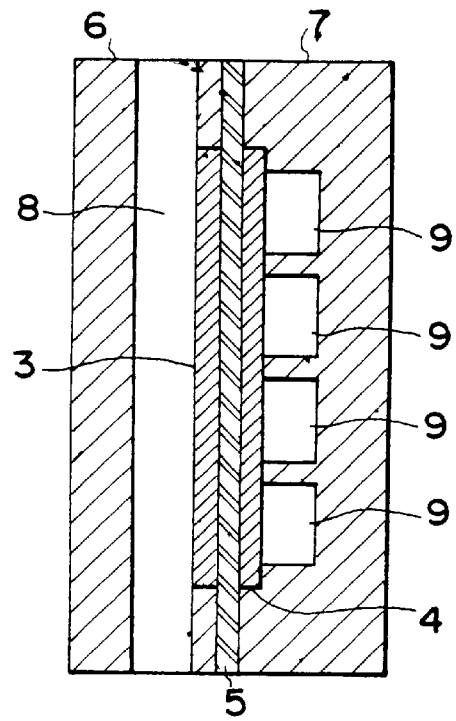
FIG. 2 is a cross-section of a single fuel cell unit in the system shown in FIG. 1.

Shown in FIG. 2 is the structure of a single fuel cell unit which, as known in the art, comprises cathode 3/electrolyte membrane 5/anode 4 formed in a thin film, which is held between a pair of carbon connector plates or separators 6, 7. Between separator 6 and cathode 3 are provided a plurality of air passages 8, whereas between separator 7 and anode 4 are provided a plurality of hydrogen gas passages 9. In a preferred embodiment, air passages 8 and hydrogen gas passages 9 extend perpendicular to each other. For example, the former extends vertically and the latter extends horizontally. In actual application, a plurality of fuel cell units 2 are stacked one upon another to form a fuel cell stack.

In this embodiment, hydrogen storing alloy 11 is $Ti_u Zr_v Cr_w Fe_x Mn_y Cu_z$ where u to z represent any integers. A known system may be used to facilitate the endothermic reaction of hydrogen storing alloy 11 for release of hydrogen gas therefrom. For example, a heater (not shown) is provided to heat hydrogen storing alloy 11 and its casing to above a predetermined temperature. The heater operates when the exhaust gas from cathode 3 of fuel cell unit 2 has not reached a predetermined temperature that is sufficiently high to cause the endothermic reaction of hydrogen storing alloy 11, for example, at the start-up phase of fuel cell unit 2. Once the exhaust gas temperature has risen to the predetermined temperature, the heater operation is discontinued. Another heating means may be used solely or in combination with the heater. For example, a coolant passage surrounding fuel cell unit 2 is extended to the casing of hydrogen storing alloy 11 so that hydrogen storing alloy 11 is heated by the coolant which has been heated by fuel cell unit 2 during continuous operation thereof.

A supply pipe 26 is connected between a hydrogen source 27 and hydrogen storing alloy 11 for supplying hydrogen gas from the former to the latter. When fuel cell unit 2 is at a standstill, hydrogen storing alloy 11 is cooled down by the water sprayed onto the surface of cathode 3. Accordingly, the exothermic reaction of hydrogen storing alloy 11 proceeds effectively so that hydrogen storing alloy 11 becomes saturated with hydrogen gas. In some cases, there is provided an additional cooling unit, such as a heat exchanger, for cooling hydrogen storing alloy 11.

Figure 3:
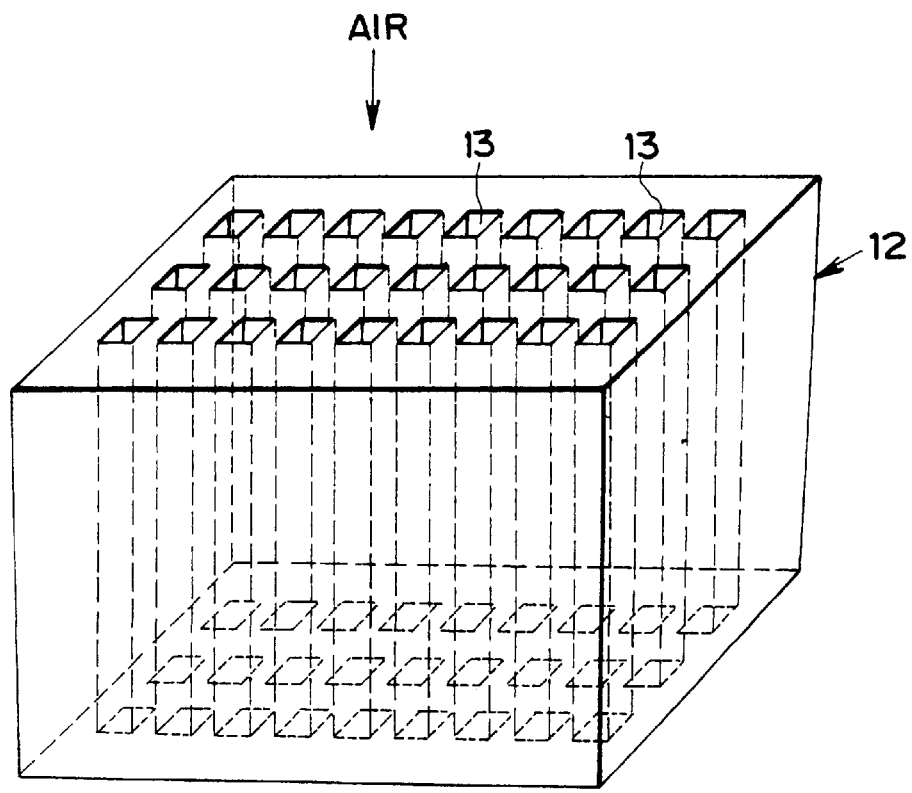
FIG. 3 is a schematic view diagrammatically showing an example of a casing for receiving hydrogen storing alloy.

An example of the casing is shown in FIG. 3 which provides a good heat exchange capacity with the exhaust gas from fuel cell unit 2 and a decreased resistance to the exhaust gas flow. In this example, a casing 12 has a plurality of vertically extending holes 13 for passing the exhaust gas therethrough. When the exhaust gas of a raised temperature passes through holes 13, it is subjected to heat exchange with the casing 12 and, therefore, heats the hydrogen storing alloy contained therein. Each hole 13 has a rectangular cross-section in the illustrated example, but of course may have polygonal, oval or circular cross-sectional shape. Holes 13 preferably extend vertically to facilitate water drops in the exhaust gas flow falling with gravity, but another design such as slanted or spiral holes may be adopted.

Figure 4:
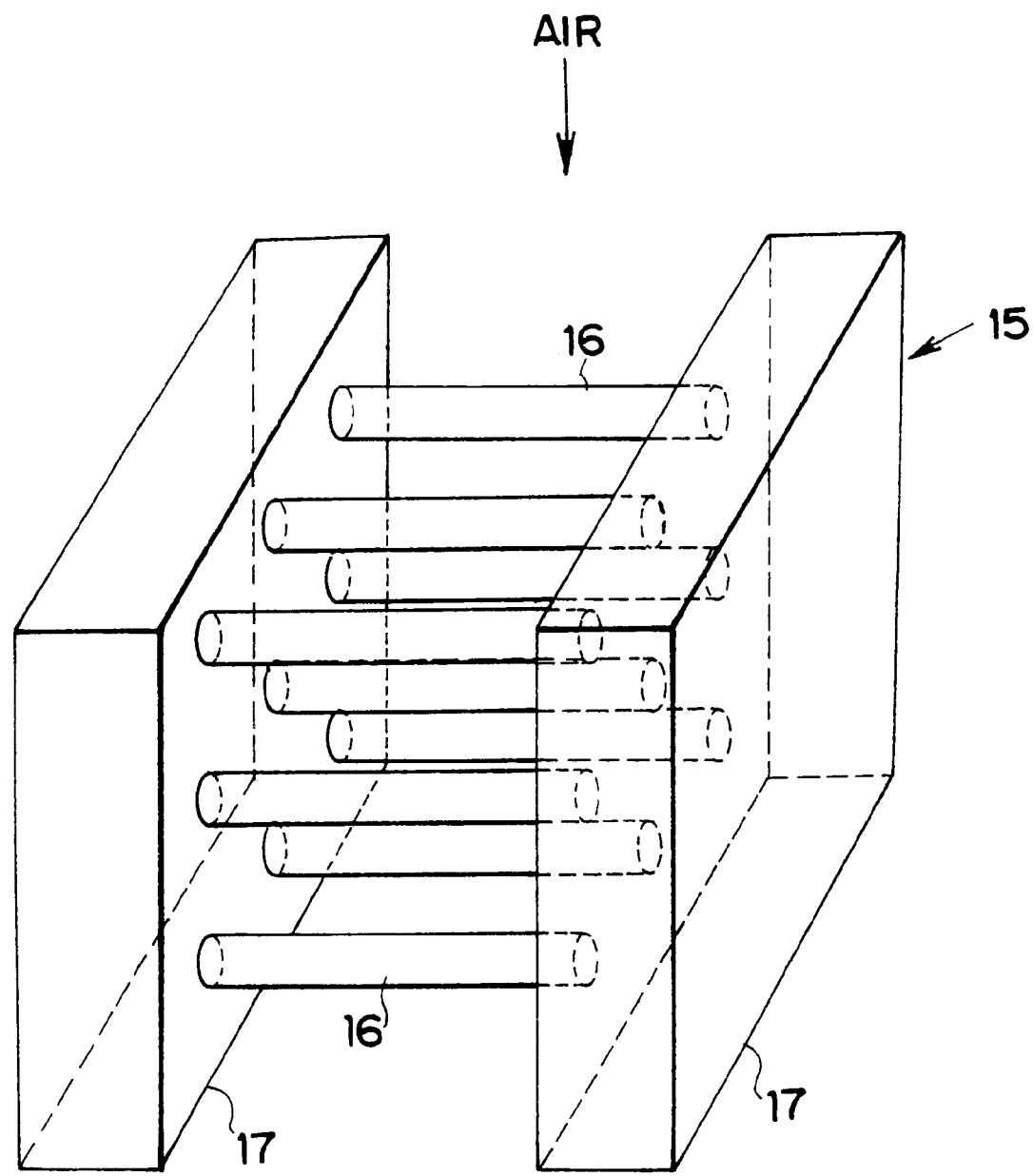
FIG. 4 is a schematic view diagrammatically showing another example of a casing for receiving hydrogen storing alloy.

In another example shown in FIG. 4, a casing 15 comprises a plurality of elongated pipes 16, each containing hydrogen storing alloy, supported between a pair of opposed retainers 17, 17. Each pipe 16 has any suitable cross-sectional shape. In a preferred design, each pipe 16 extends not horizontally, but slantwise which allows water drops to fall down therealong into guide grooves (not shown) in retainers 17.

Hydrogen gas discharged from alloy 11 is fed to hydrogen gas passages 9 of fuel cell unit 2 via a feed pipe 20 with a control valve 21 which is operated by electromagnetic valve 23 to regulate a hydrogen gas pressure in pipe 20. The hydrogen gas pressure is monitored by a pressure gauge 25 located just before fuel cell unit 2. A signal representing the monitored pressure is sent back to electromagnetic valve 23 for regulation of the degree of opening of control valve 21.

Fuel gas supply system 10 also includes an exhaust pipe 30 through which the remainder of the hydrogen gas which has not been consumed in fuel cell unit 2 is exhausted to the open air. Exhaust pipe 30 is provided with a check valve 31 and an electromagnetic valve 32. Check valve 31 prevents entry of the ambient air into anode 4 of fuel cell unit 2 through exhaust pipe 30. Electromagnetic valve 32 is opened intermittently for full combustion of hydrogen gas.

Air supply system 40 has a feed pipe, with a fan 43, through which the ambient air is introduced into an air intake manifold 45 and then into air passages 8 of fuel cell unit 2. The exhaust air from cathode 3 is subjected to heat exchange with hydrogen storing alloy 11 so that steam in the exhaust air is condensed into water drops, which is collected by a condenser 51, and then discharged to the open air. The temperature of the exhaust air is monitored by a thermometer 47.

In the illustrated embodiment, air intake manifold 45 is provided with a plurality of water injection nozzles 55 from which liquid water is sprayed onto the surface of cathode 3. Most of the sprayed water is fed to condenser 51 while remaining in liquid state, which is then fed into a water tank 53. A part of the sprayed water evaporates while passing through air passages 8 at cathode 3 of fuel cell unit 2, which is condensed into water drops by heat exchange with hydrogen storing alloy 11 or by condenser 51, and is also fed into water tank 53. The exhaust air from cathode 3 may include water (steam) that is generated by the fuel cell reaction between hydrogen and oxygen. Condenser 51 is also used where system 1 involves humidifying the ambient air before introducing it into air intake manifold 45, as disclosed in Japanese un-examined patent publication No. 7-176313.

Water supply system 50 is a closed system in which water in tank 53 is pumped up by a pump 61 and sprayed from nozzles 55 onto the surface of cathode 3, which is collected by condenser 51 to be fed again to tank 53. The water level in tank 53 is monitored by a level sensor 56. When the water level is found to be below a predetermined level, tank 53 is refilled with water from an outside water source. Tank 53 has a heater 57 and an electromagnetic valve 58 for preventing water from freezing in the Winter. Another electromagnetic valve 60 prevents evaporation of water in tank 53.

During operation of fuel cell unit 2, water sprayed from nozzles 55 continuously or intermittently onto the surface of cathode 4 will take latent heat away from the ambient air and the surface itself as it evaporates, which effectively prevents evaporation of water contained in electrolyte membrane 5. Accordingly, electrolyte membrane 5 remains suitably moist. Another function of the sprayed water is to take away heat from cathode 4, which contributes to temperature control of fuel cell unit 2. This makes it unnecessary to employ a separate cooling unit in which fuel cell unit 2 is cooled with a coolant. The output of pump 61 is regulated in response to the temperature of the exhaust air detected by thermometer 47 to control the temperature of the fuel cell unit below a predetermined temperature.

In output system 70 includes a switch relay 71, a rectifying diode 73 and a secondary battery 75, and feeds the output of fuel cell unit 2 to a motor 77. The output is monitored by a voltmeter 76, the result of which is supplied to a control circuit (not shown) for regulating the degree of opening of electromagnetic valve 33.

With system 1 as described above, the exhaust gas or air at an elevated temperature from cathode 3 of fuel cell unit 2 is supplied to hydrogen storing alloy 11 for heating the same. In addition, when water (steam) contained in the discharge air from cathode 3 of fuel cell unit 2 contacts the hydrogen storing alloy 11 it condenses into water drops, giving up its latent heat to hydrogen storing alloy 11. This enhances the endothermic reaction to discharge hydrogen gas, which is supplied through feed pipe 20 to anode 4 of fuel cell unit 2. Accordingly, there is no need to convey heat, which has been taken away from fuel cell unit 2 with a coolant or water, to hydrogen storing alloy 11. In other words, no feed pipe connected between fuel cell unit 2 and hydrogen storing unit 11 for feeding the heated water to the latter is required. This of course reduces the number of components of the overall system, lowers the manufacturing costs and improves capacity and durability of the system.

Figure 5:
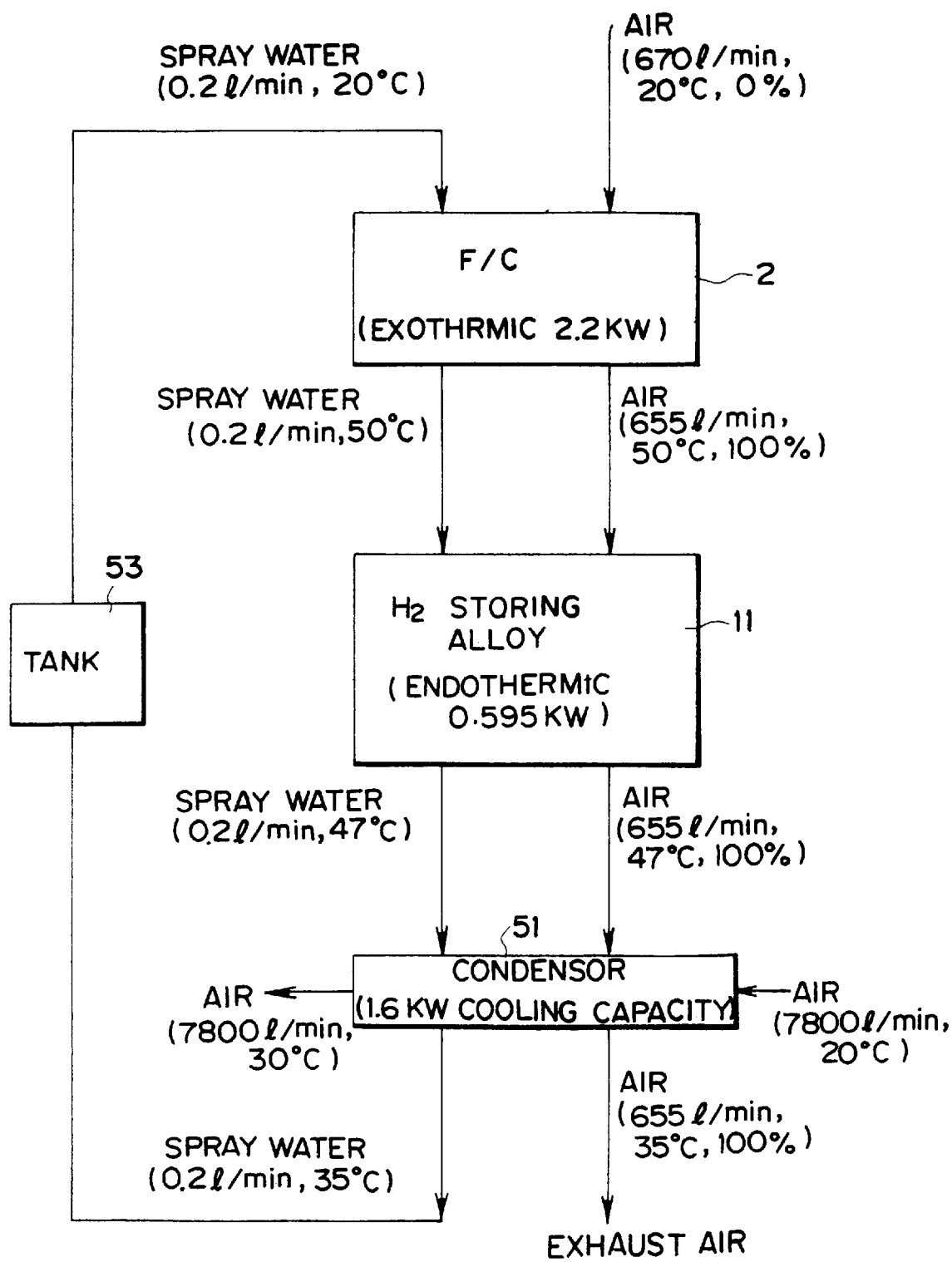
FIG. 5 is a flowchart showing energy transfers in the fuel cell system in accordance with an embodiment of the present invention.

FIG. 5 is a flowchart showing energy transfer in system 1 by way of example, in which change state of the air are shown at right and changes to the water are shown at left. The conditions of the water at each stage are represented by its flow rate and temperature, whereas for air, flow rate, temperature and humidity are given. As shown, the system of the present invention provides a favorable energy exchange throughout the air flow path to facilitate the endothermic reaction of hydrogen storing alloy 11 to thereby produce a sufficient amount of hydrogen gas.

Figure 6:
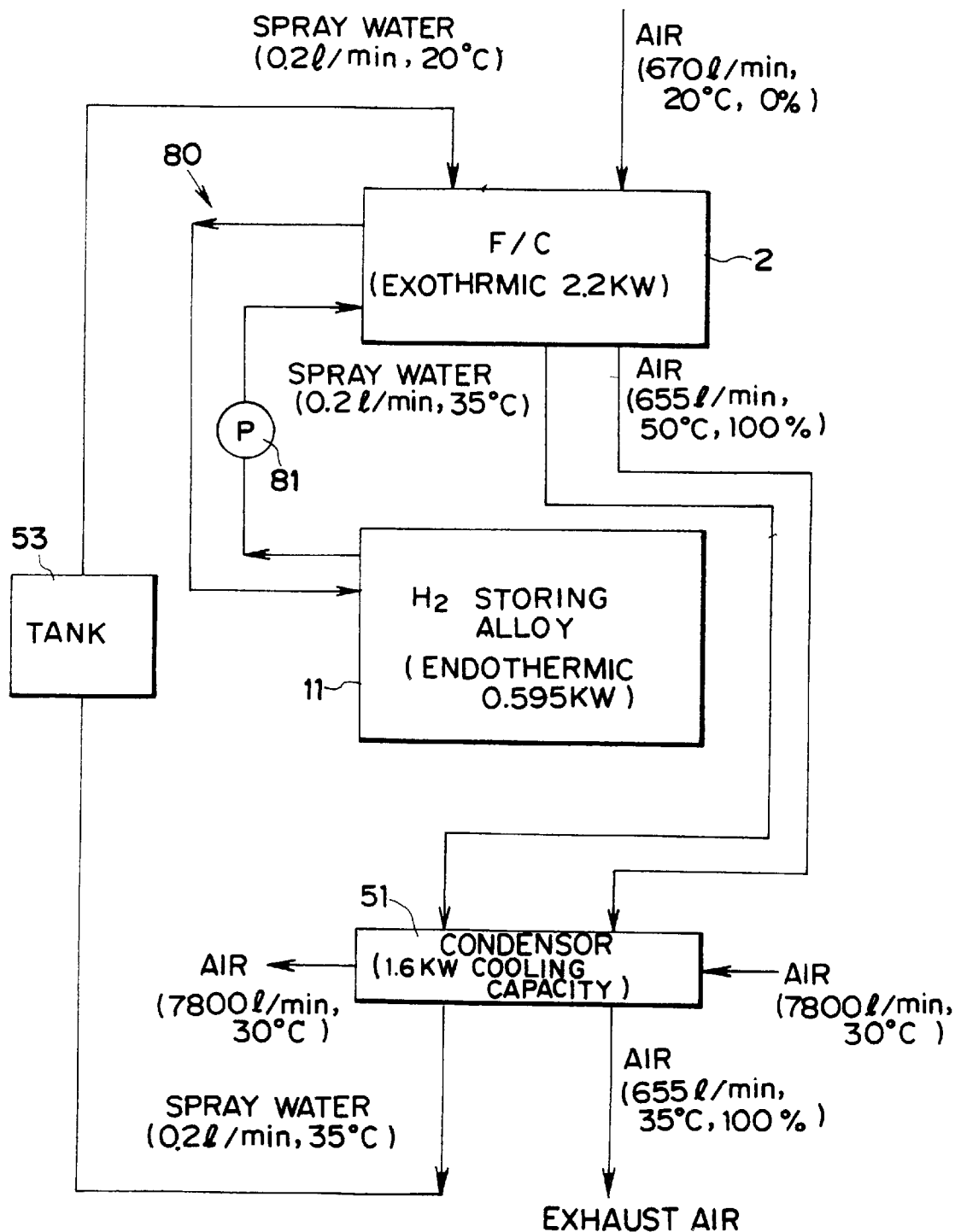
FIG. 6 is a flowchart showing energy transfers in an equivalent example of the prior art fuel cell system.

For comparison, FIG. 6 shows energy transfer in an example of the prior art fuel cell system in which fuel cell unit 2, hydrogen storing alloy 11 and condenser 51 are all equivalent to those in system 1 of FIG. 5. This prior art system has a water circulation path 80, with a pump 81, between fuel cell unit 2 and hydrogen storing alloy 11. A coolant or water heated by fuel cell unit 2 in operation is used for heating hydrogen storing alloy 11. The coolant is somewhat cooled due to the endothermic reaction of hydrogen storing alloy 11 and then fed again to fuel cell unit 2 for cooling the same. As is apparent from comparison between the arrangements in FIG. 5 and FIG. 6, the system of the present invention is much more simple in construction than the prior art.

In normal operation of the system of the present invention, fuel cell unit 2 can be made inoperative by closing valve 23 in fuel gas supply system 10. During this inoperative phase, fan 43 is not driven so that no air (oxygen) is supplied to cathode 3 of fuel cell unit 2 by air supply system 40, whereas in water supply system 50 water in tank 53 is pumped up to nozzles 55 from which it is continuously or intermittently sprayed onto the surface of cathode 3 of fuel cell unit 2. As described above, the sprayed water is discharged, together with the exhaust air, from cathode 3 and introduced to the hydrogen storing alloy 11 for cooling the same, which facilitates its exothermic reaction in which it absorbs hydrogen gas that is supplied from a refill station or other external source (not shown). The water quantity to be supplied from tank 53 to nozzles 55 is regulated in response to the exhaust air temperature detected by thermometer 47. If a necessary cooling effect can not be obtained by the sprayed water alone, an additional cooling unit may be provided. For example, there may be provided a coolant passage surrounding the casing of hydrogen storing alloy 11 and an auxiliary heat exchanger.

Figure 7:
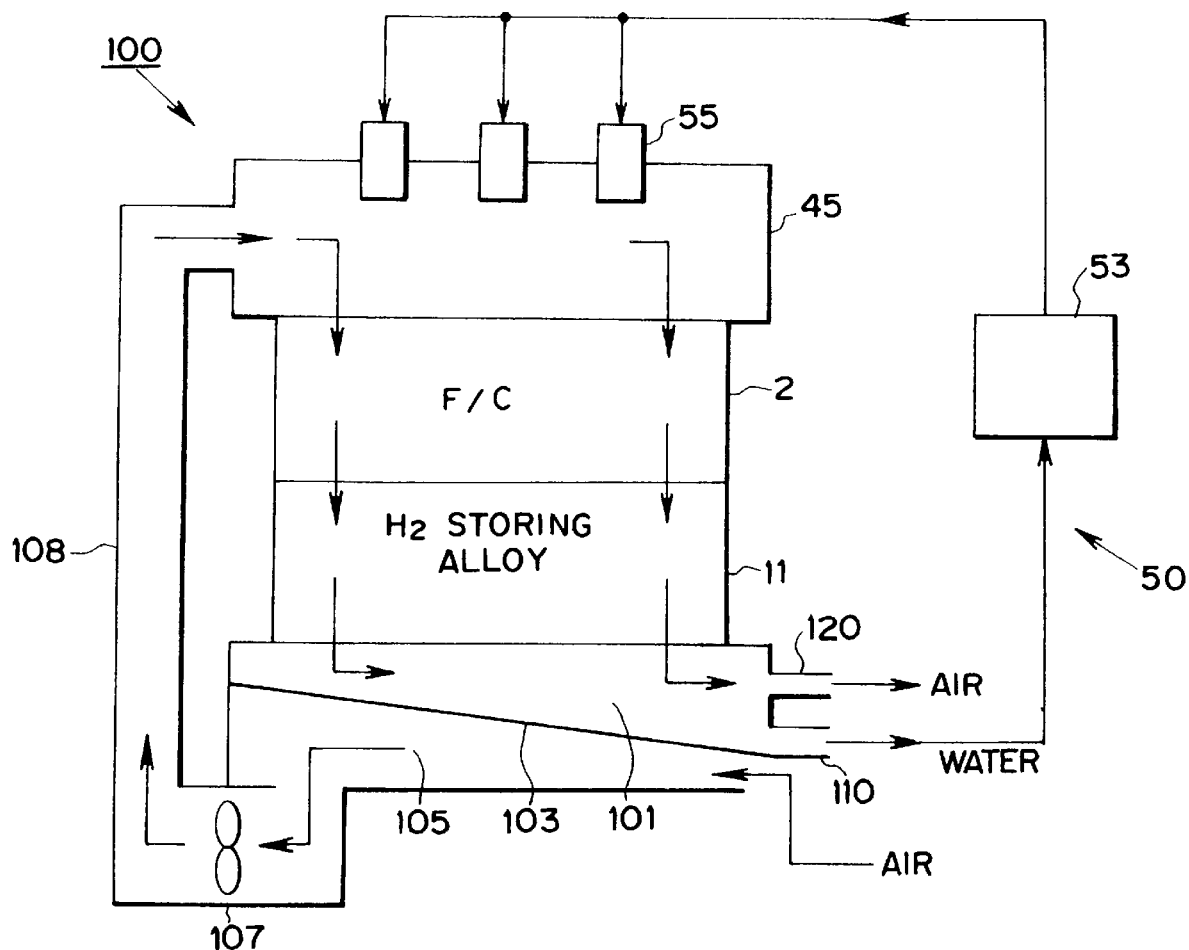
FIG. 7 is a schematic view diagrammatically showing the structure of a fuel cell system in accordance with another embodiment of the present invention.

FIG. 7 shows another embodiment of a fuel cell system 100 in which identical parts and members are shown by the same numerals. System 100 has an air supply system that is modified from the air supply system 40 in FIG. 1. More specifically, in system 100, an air intake manifold 45, a fuel cell unit 2 and a hydrogen storing alloy 11 are arranged in series in a substantially vertical direction as in the foregoing system 1, but beneath hydrogen storing alloy 11 are arranged an exhaust port 101 and a suction port 105 divided by a slanting partition wall 103 of heat conductive material, such as stainless steel, which provides effective heat exchange between air in exhaust port 101 and in suction port 105. Exhaust port 101 has a drain at the lowermost end of partition wall 103. Air in suction port 105 is supplied, via a fan 107 and a passage 108, to air intake manifold 45.

With this system 100, water sprayed by nozzles 55 passes through air passage 8 at cathode 3 of fuel cell unit 2 so that cathode 3 remains in a suitably moist condition and fuel cell unit 2 is effectively cooled. The exhaust air from cathode 3 which has been heated to an elevated temperature is supplied to hydrogen storing alloy 11 for heating the same. By heat exchange with hydrogen storing alloy 11, a part of the water (steam) contained in the exhaust air is condensed into water drops, so that hydrogen storing alloy 11 is further heated by the latent heat generated in condensation. The exhaust air is then introduced into exhaust port 101. Since the exhaust air at the outlet of hydrogen storing alloy 11 is 47° C. (FIG. 5), for example, which is considerably higher than the temperature of the ambient air introduced into suction port 105, the exhaust air in exhaust port 101 is effectively cooled by heat exchange with the air in suction port 105. At this time, steam in the exhaust air in exhaust port 101 is condensed into waterdrops which adhere to the upper surface of partition wall 103 and then falls down therealong to be discharged through drain 110. The discharged water is fed to tank 53 for water circulation throughout water supply system 50. A part of the sprayed water remains in liquid state. Another part of the sprayed water evaporates when heated by fuel cell unit 2 but is soon condensed into waterdrops on the surface of the casing of hydrogen storing alloy 11. This liquid water will drop with gravity onto partition wall 103 and is then fed to tank 53 in the manner as described above.

Figure 8:
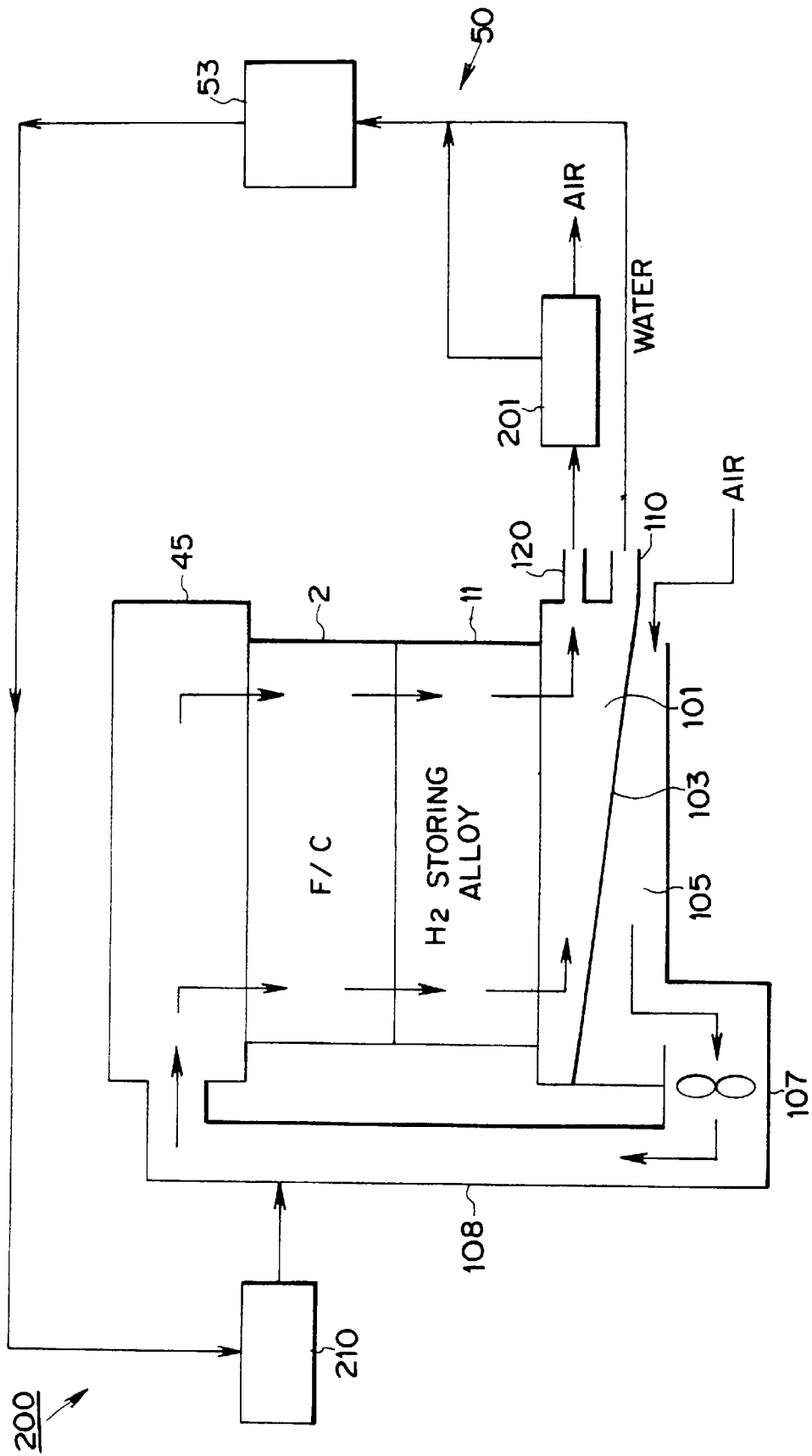
FIG. 8 is a schematic view diagrammatically showing the structure of a fuel cell system in accordance with still another embodiment of the present invention.

In a modified system 200 in FIG. 8, a water condenser 201 is mounted downstream of an air exhaust port 120 for collecting water still remaining in the exhaust air, which is also returned to water supply system 50. In this system 200, water in tank 53 is supplied to a humidifier 210 where it is evaporated into steam which is introduced into the air supply system.

Figure 9:
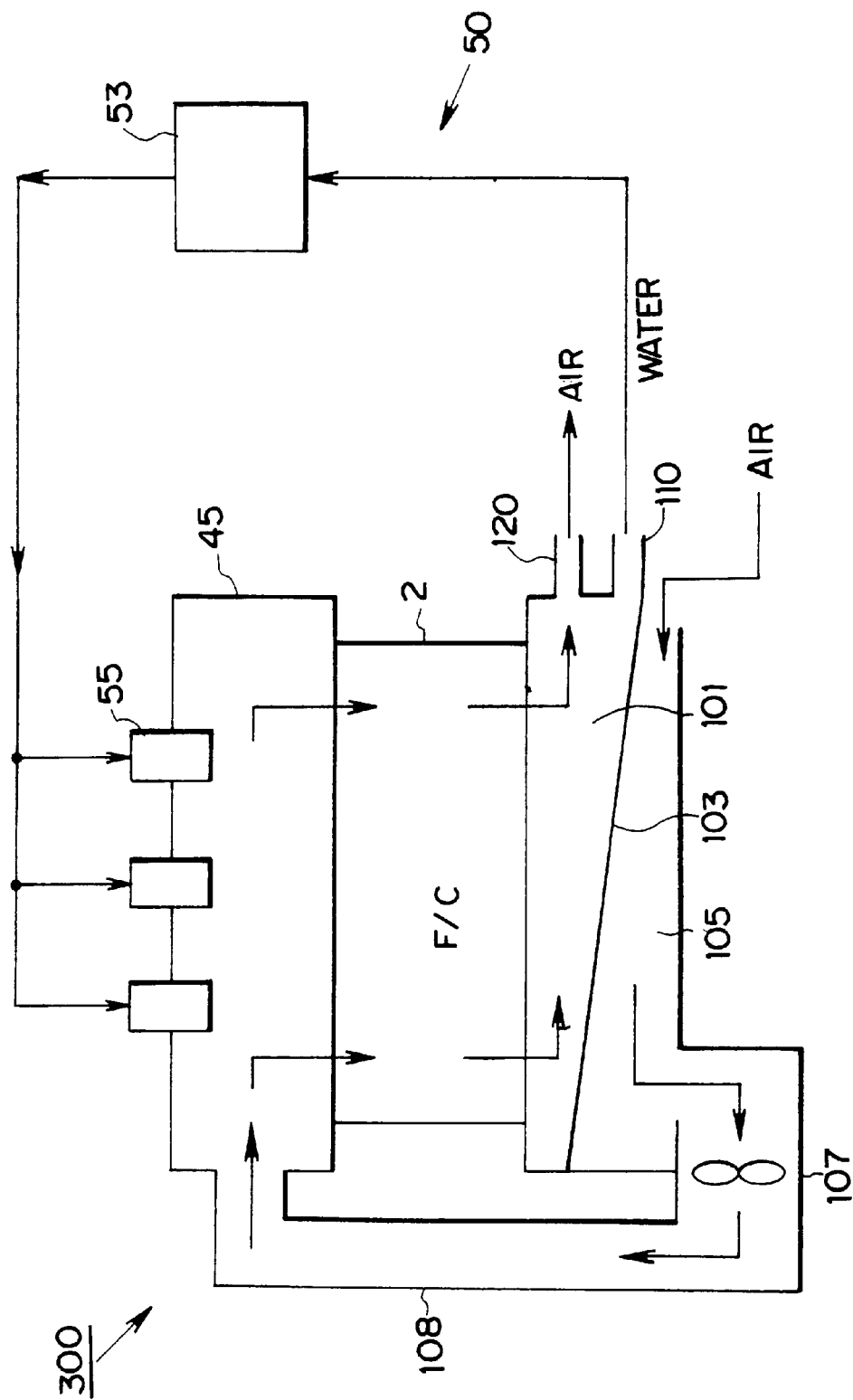
FIG. 9 is a schematic view diagrammatically showing the structure of a fuel cell system in accordance with still another embodiment of the present invention.

System 300 in FIG. 9 is substantially identical with system 100 in FIG. 7 except that it includes no hydrogen storing alloy. In this system, a hydrogen storing alloy (not shown) is not a part of the system but is mounted independent of the system at a remote location. In this case, the exhaust air from the cathode of fuel cell unit 2 is not supplied to the hydrogen storing alloy. The exhaust air from an air exhaust port 120 may be introduced to a water condenser, as shown in FIG. 8, so that water contained therein is fed to a tank 53.

With system 300 in FIG. 9, water sprayed by nozzles 55 passes through air passage 8 at the cathode of fuel cell unit 2 so that cathode 3 remains in a suitably moist condition and fuel cell unit 2 is effectively cooled. The exhaust air from the cathode which has been heated to an elevated temperature is introduced into an exhaust port 101 where it is cooled by heat exchange with the air of a lower temperature in a suction port 105. At this time, steam in the exhaust air in exhaust port 101 is condensed into waterdrops which adhere on the upper surface of a partition wall 103 and then fall down therealong to be discharged through a drain 110. The discharged water is fed to tank 53 for water circulation throughout water supply system 50. A part of the sprayed water remains in liquid state, which will drop with gravity onto partition wall 103 and then be conveyed to tank 53 in the manner as described above.

Figure 10:
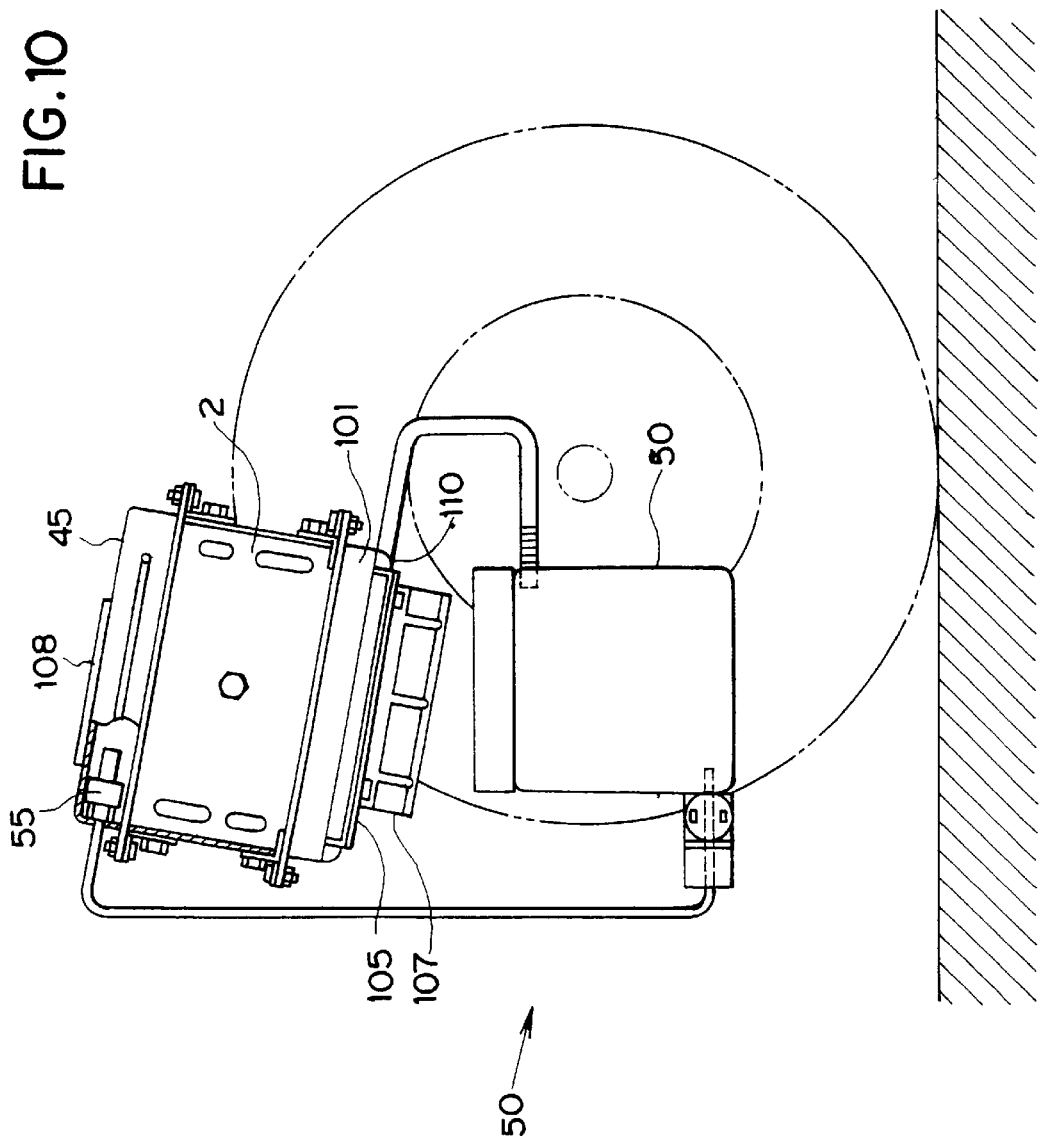
FIG. 10 is a side view showing an actual example of application in which the fuel cell system of FIG. 9 is mounted on a vehicle.
Figure 11:
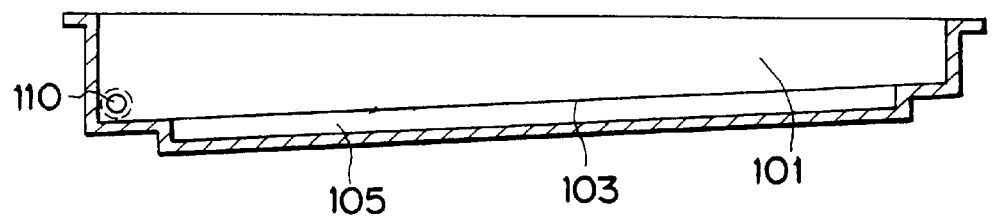
FIG. 11 is a cross-section of a chamber including exhaust and suction ports with a partition wall that may be used in the fuel cell system of the present invention.

In actual application, the fuel cell system of the present invention may be mounted on a vehicle, a typical example of which is shown in FIG. 10. In FIG. 10, the air feed passage 108 for feeding the air in the suction port 105 to the air intake manifold 45 is mounted behind the fuel cell unit 2. The system in FIG. 10 employs a chamber or receptacle comprising exhaust port 101, partition wall 103 and suction port 105, which is specifically shown in FIG. 10 as a cross-section thereof.

Figure 12:
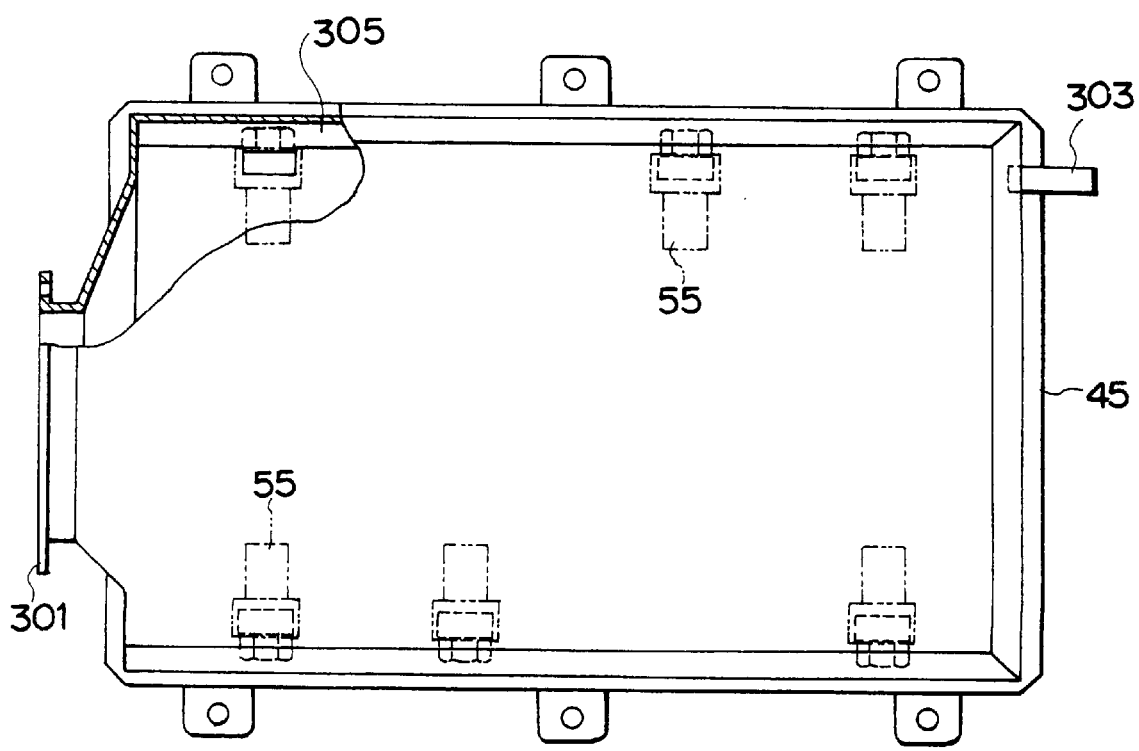
FIG. 12 is a plan view, partially broken, showing an air manifold attached to the fuel cell unit of the present invention.

The air intake manifold 45 in the system of the present invention may have an arrangement as shown in FIG. 12 where manifold 45 is shown as having an air inlet opening 301 and a water inlet opening 303. Water introduced through opening 303 flows along a surrounding trough 305 and then is sprayed by nozzles 55 that communicate with trough 305.

Figure 13:
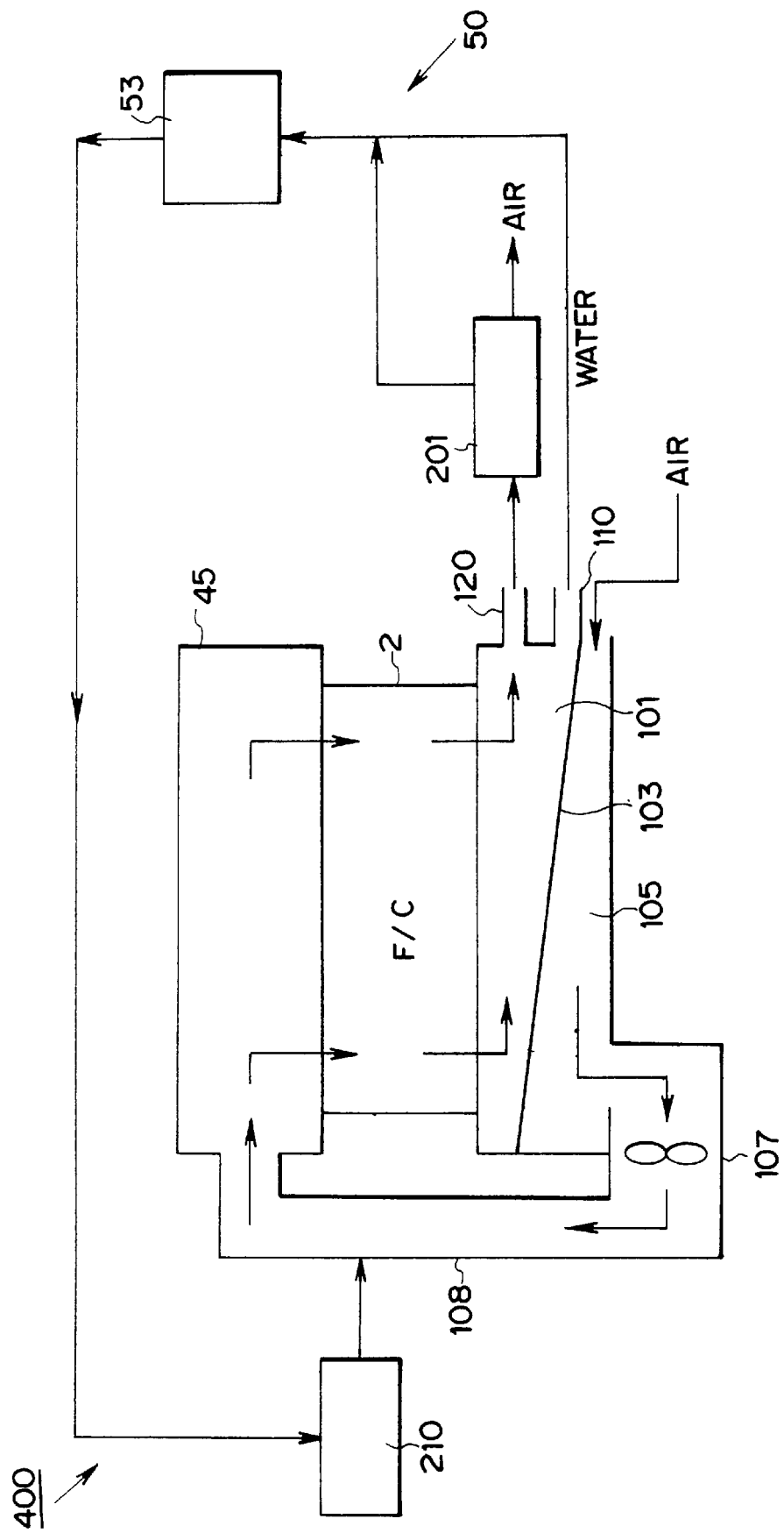
FIG. 13 is a schematic view diagrammatically showing the structure of a fuel cell system in accordance with still another embodiment of the present invention.

System 400 in FIG. 13 is substantially identical with system 200 in FIG. 8 except that it includes no hydrogen storing alloy. In this system, a hydrogen storing alloy (not shown) is not a part of the system but is mounted independent of the system at a remote location. In this case, the exhaust air from the cathode of fuel cell unit 2 is not supplied to the hydrogen storing alloy. In this system, a part of steam in the exhaust air from an air exhaust port 120 is collected at the surface of a partition wall 103 by heat exchange with the air in a suction port 105 and another part is collected by a water condenser 201, both parts of which are fed to a tank 53. Water condenser 201 may be omitted in another modified system.

Although the present invention has been described in conjunction with specific embodiments thereof, it is to be understood that it is capable of considerable variation and modification without departure from the scope of the appended claims. For example, the water spray nozzle is preferably mounted on the air intake manifold at the cathode but may be provided at any location and at any distance from the cathode, as long as it can supply liquid water to the cathode. When the fuel cell system is installed at the factory or home, it may be coupled to waterworks so that city water is supplied to the cathode.

What is claimed is:

1. A fuel cell system comprising:
   at least one fuel cell unit having an anode, a cathode and an electrolyte membrane interposed between said anode and said cathode, for reaction of a hydrogen gas with an oxygen-containing gas to form water of reaction and to produce energy, with generation of an exhaust gas containing the water of reaction;

a hydrogen storing alloy from which the hydrogen gas is discharged, for supply to said anode of said fuel cell unit, when heated;

a plurality of gas passages open to and traversing at least one dimension of said cathode for bringing the oxygen-containing gas into direct contact with said cathode and for conveying the exhaust therefrom;

heating means for heating said hydrogen storing alloy by heat exchange with the exhaust gas from said gas passages;

a tank for collecting the water of reaction condensed out of the exhaust gas by said heat exchange; and liquid water circulating means for supplying liquid water from said tank, said liquid water circulating means including at least one sprayer for forming the supplied liquid wafer into a spray directly contacting directly into said gas passages and into direct contact with said cathode while in liquid state.

2. A fuel cell system comprising:

at least one fuel cell unit having an anode, a cathode and an electrolyte membrane interposed between said anode and said cathode, for reaction of a hydrogen gas with an oxygen-containing gas to form water of reaction and to produce energy, with generation of an exhaust gas containing the water of reaction;

a plurality of gas passages traversing at least one dimension of said cathode for bringing the oxygen-containing gas into direct contact with said cathode and for conveying the exhaust therefrom;

liquid water supply means for supplying liquid water into said gas passages and into direct contact with said cathode while in the liquid state;

an exhaust chamber arranged downstream from said fuel cell unit for passage therethrough of the exhaust gas;

a feed chamber arranged below said exhaust chamber for feed therethrough of the oxygen-containing gas to be supplied to said cathode; and a partition member between said exhaust chamber and said feed chamber for effecting heat exchange between the exhaust gas in said exhaust chamber and the oxygen-containing gas in said feed chamber.

3. A fuel cell system according to claim 2 which further comprises a hydrogen storing alloy arranged between said fuel cell unit and said exhaust chamber and means for heating said hydrogen storing alloy by heat exchange with the exhaust gas from said fuel cell unit to cause said hydrogen storing alloy to release hydrogen gas for supply to said fuel cell unit.

4. A fuel cell system according to claim 3 further comprising another source of hydrogen gas and hydrogen supply means for routing hydrogen gas from said another source into contact with said hydrogen storing alloy and wherein said liquid water supply means supplies water in liquid state through said fuel cell unit into contact with said hydrogen storing alloy, when said fuel cell unit is operative, so as to cool said hydrogen storing alloy to thereby enhance an exothermic reaction whereby the hydrogen gas from said another source is stored in said hydrogen storing alloy.

5. A fuel cell system comprising:

at least one fuel cell unit having an anode, a cathode and an electrolyte membrane interposed between said anode and said cathode, for reaction of a hydrogen gas with an oxygen-containing gas to form water of reaction and to produce energy, with generation of an exhaust gas containing the water of reaction;

a hydrogen storing alloy from which the hydrogen gas is discharged for supply to said anode of said fuel cell unit when heated, said hydrogen storing alloy being located vertically below said fuel cell unit and having at least one gas flow path extending therethrough from an upper inlet to a lower outlet;

a plurality of gas passages traversing at least one dimension of said cathode, from feed inlets to exhaust outlets, for bringing the oxygen-containing gas into direct contact with said cathode, said exhaust outlets being connected to said upper inlet of said gas flow path;

another source of hydrogen gas; and liquid water supply means for supplying liquid water into said gas passages and into direct contact with said cathode while in liquid state, whereby said hydrogen storing alloy is heated by the exhaust gas for release of hydrogen when said fuel cell unit is operative and is cooled by the liquid water for absorption of hydrogen from said another source when said fuel cell unit is inoperative.

6. A fuel cell system according to claim 5 wherein liquid water supply means includes at least one sprayer for spraying the liquid water into said fuel cell unit.

* * * * *